C. H. CAMPBELL.
METHOD OF TREATING MILK.
APPLICATION FILED JULY 25, 1913.

1,221,024.

Patented Apr. 3, 1917.
3 SHEETS—SHEET 1.

WITNESSES:
René Bruine
Fred White

INVENTOR:
Charles H. Campbell,
By Attorneys,
Fraser, Dunk & Myers

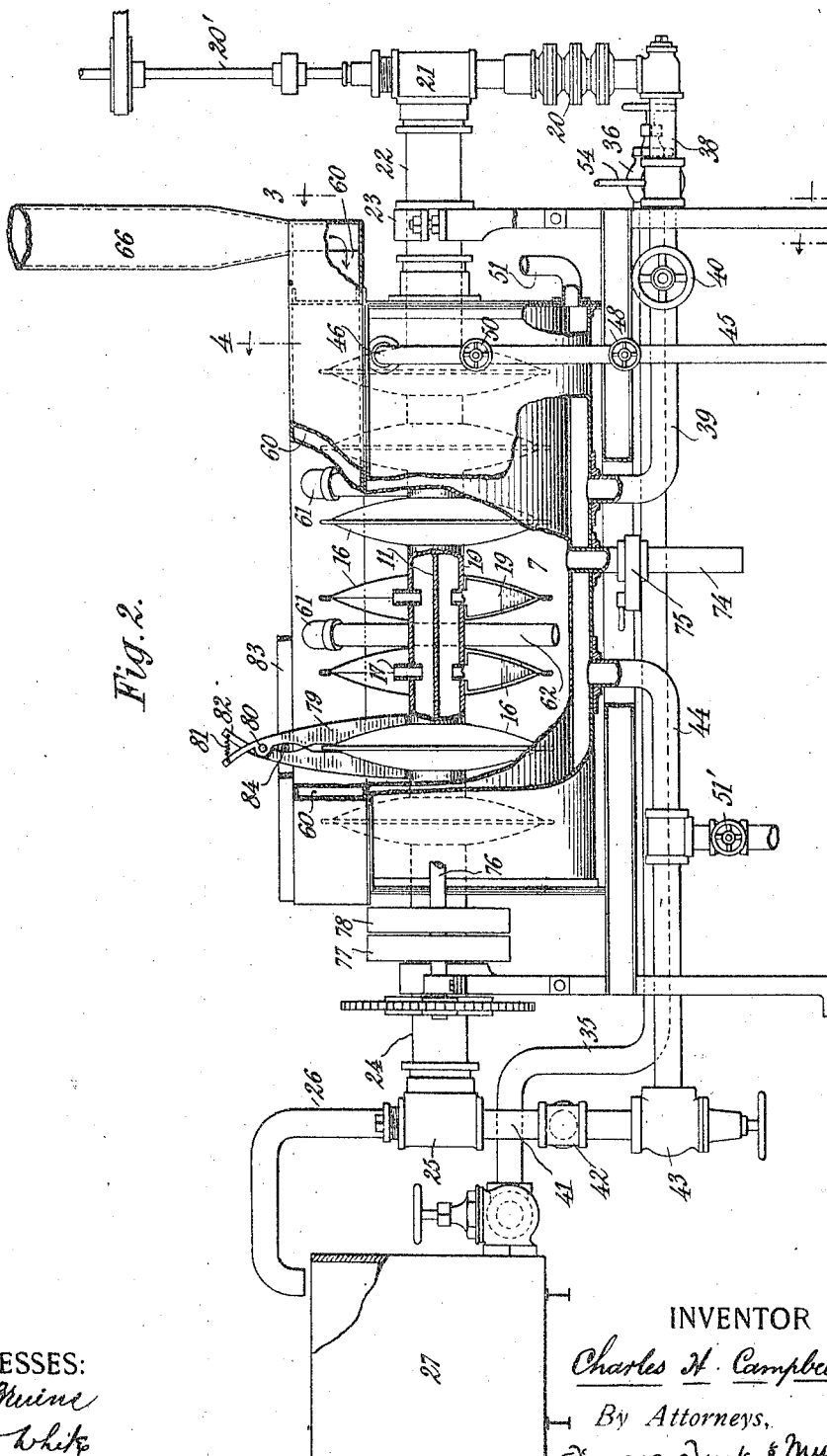

C. H. CAMPBELL.
METHOD OF TREATING MILK.
APPLICATION FILED JULY 25, 1913.
1,221,024.
Patented Apr. 3, 1917.
3 SHEETS—SHEET 3.
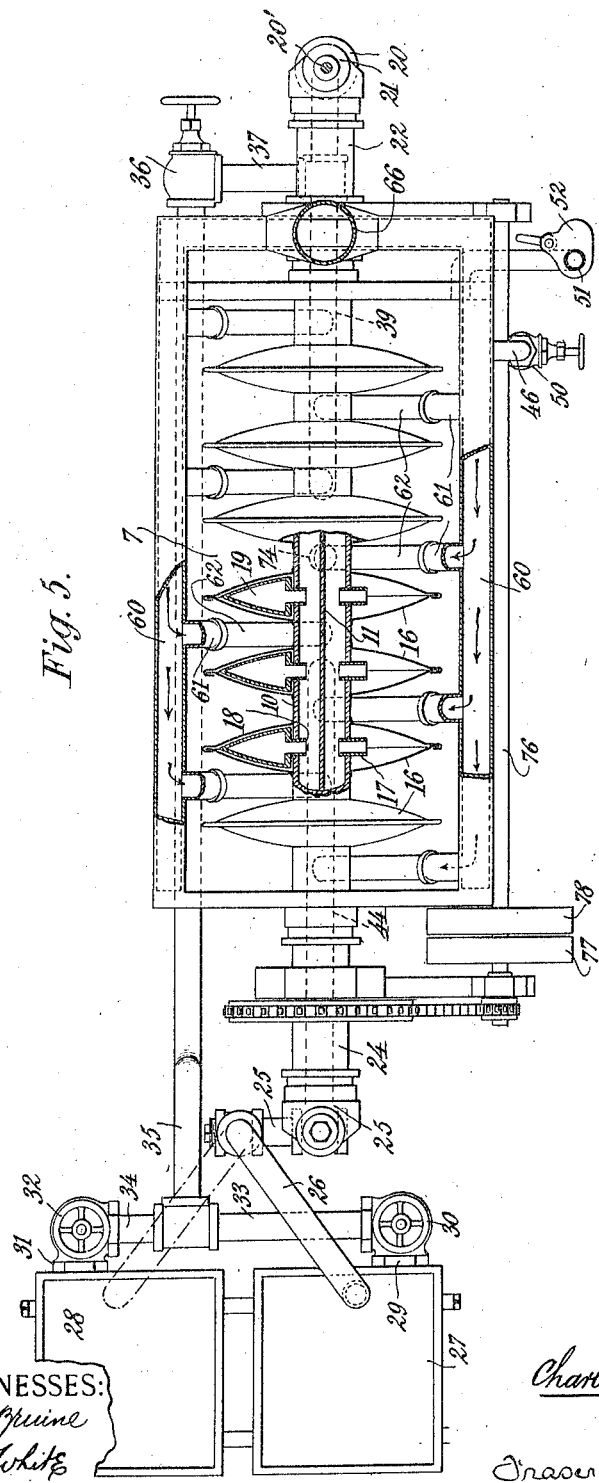
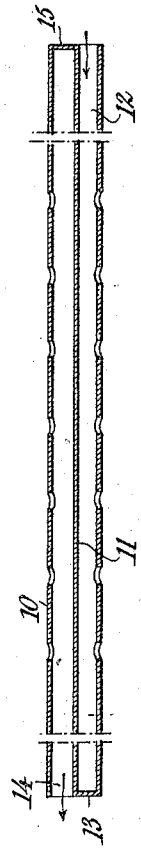
INVENTOR
Charles H. Campbell,
By Attorneys,
Fraser, Durk & Myers
WITNESSES:
René Bruine
Fred White

UNITED STATES PATENT OFFICE.

CHARLES H. CAMPBELL, OF NEW YORK, N. Y., ASSIGNOR, BY MESNE ASSIGNMENTS, TO BORDEN'S CONDENSED MILK COMPANY, OF NEW YORK, N. Y., A CORPORATION OF NEW JERSEY.

METHOD OF TREATING MILK.

1,221,024.       Specification of Letters Patent.       Patented Apr. 3, 1917.

Application filed July 25, 1913. Serial No. 781,081.

*To all whom it may concern:*

Be it known that I, CHARLES H. CAMPBELL, a citizen of the United States, residing in the borough of Manhattan, city, county, and State of New York, have invented a certain new and useful Method of Treating Milk; of which the following is a specification.

This invention relates to the art of heat-treating milk, and is peculiarly adapted to the treatment which requires the elimination or neutralization of the heat units added in effecting certain desired results, as for instance in the evaporation, or in the pasteurization, of milk, which I have discovered requires that the milk under treatment be raised to a given uniform temperature throughout the entire mass under treatment as rapidly as possible, and without delay cooled uniformly throughout this entire mass rapidly.

In some methods, now in use, of treating milk in which bacteria and pathological germs develop rapidly at certain temperatures, it has been found that during the interval elapsing between the heating and the cooling, and also the time elapsing to eliminate the heat units from the entire mass, the ideal conditions for development of bacteria and germs persist for a sufficient length of time to permit propagation to an extent which will practically render *nil* the effects sought to be attained by the treatment. In the present improvement the milk under treatment is quickly, and uniformly throughout the mass, brought to the desired temperature, maintained at that temperature for the required length of time, and without an appreciable interval of time elapsing, quickly, and uniformly throughout the entire mass, cooled to the desired temperature. This is all accomplished within the same vessel by the procedures hereinafter described.

The results sought to be accomplished by certain heat treatments of milk are hastened, and the product improved by aeration. The present improvement makes provision for the aeration of the milk at the same time it is being heated and being cooled, either with air at atmospheric temperature, or with air heated and cooled for these steps respectively.

This improvement is not only useful in the pasteurization of milk, but in the manufacture of evaporated milk, and condensed milk, and for eliminating false odors.

The drawings accompanying this specification illustrate one, preferred, style of apparatus which may conveniently be used in the carrying out of this improved process.

Fig. 2 is an enlarged side elevation of portions of the mechanism illustrated in Fig. 1, certain parts being broken away, and other portions in section for the better disclosure thereof;

Fig. 5 is a top view, partly plan and partly horizontal section, of the structure shown in Fig. 2; and Fig. 6 is a longitudinal section of the agitator shaft.

Figure 1:
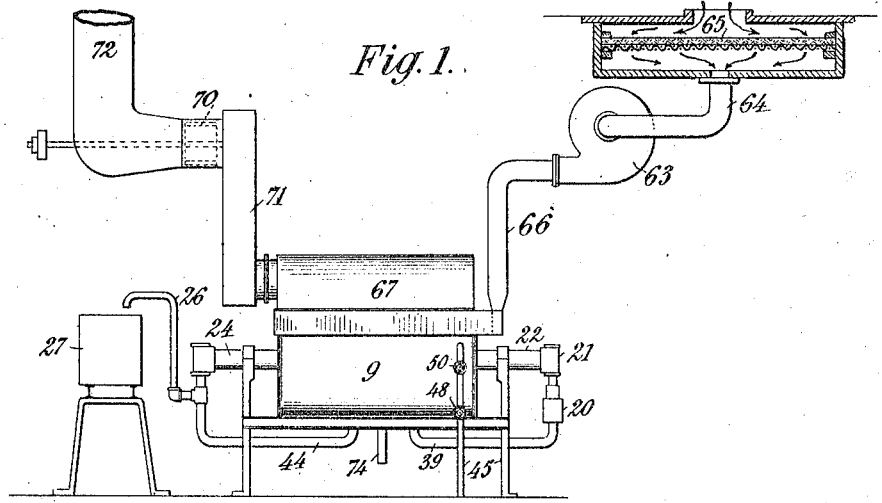
Figure 1 is a side elevation of the installation.

The milk under treatment is contained in a vessel 7, or treating chamber. This vessel is provided with a jacket space 8 which is located between the walls of the vessel 7 and the jacket walls 9. During the treatment of the milk it is agitated. For the purpose of agitation and the more quick response to the heating and cooling, the agitators will be heated and cooled. The cylindrical agitator shaft 10 is shown extending from end to end of the vessel 7, which vessel is illustrated with a semi-circular bottom and of elongated form. The shaft 10 is shown horizontally disposed. A partition 11 extends from end to end of the hollow shaft. Reference may be made to Fig. 6, which shows this shaft by itself. The inlet side 12 of the shaft is closed at the far end 13, and the outlet side 14 of the shaft is closed at the end 15 adjacent the inlet end. The shaft is mounted for rotation.

The agitators, which are of the well known thin metal shell type in the form of disks 16, are shown elliptical in their section longitudinally of the shaft. The agitator disks are hollow, thus enabling them to act as liquid containers, and each is provided with means of communication to both sides of the shaft partition, that is, each interior communicates with the supply and the exhaust sides 12 and 14 respectively. The connection with the supply side is shown as a conduit in the form of a pipe 17 extending a short distance into the shaft and a short distance, in the present instance a little greater distance, into the interior of the agitator. The conduit for the exhaust is shown in the form of a tube 18 extending a substantially similar distance into the exhaust side of the hollow shaft, and a shorter distance into the interior of the agitator. These conduits are shown substantially diametrically disposed. When the exhaust from the exhaust side 14 is open and liquid is supplied to the supply side 12, it will flow uniformly into all the agitator disks, filling these and flowing out at the opposite side. By a proper regulation of the area of opening into and from the disks in respect of the area of the passages 12 and 14, and of means of supplying and exhausting, all the agitators will be of uniform temperature.

When it is desired to entirely discharge liquid which is within the agitators, either for the purpose of emptying them to discontinue the use of the apparatus or for the purpose of changing the liquid which is employed, a dipper 19 is associated with each of the outlet conduits 18, so that upon the rotation of the agitator disks the dipper will collect the remnants of the liquid within the agitator and direct these into the exhaust or discharge conduit 18.

The supply for the agitators is shown controlled by some suitable pump 20 which will pump the liquid past the T 21 through the pipe 22 and into the chamber 23 which surrounds the supply end of the shaft 10. The chamber is so located that the opening to the supply side 12 is at all times free to receive the liquid. The liquid, preferably hot water for the heat treatment, will be pumped in such volumes as may be demanded and pass into the supply side 12, and through the various supply conduits 17 into the agitators. The agitators will thus be supplied in unison and each with water which has not been used in the other agitators, thereby raising them all uniformly throughout the entire series, to the sa ne temperature. The water will exhaust through the conduits 18 into the exhaust side 14 and flow into the chamber 24 surrounding the exhaust end of the shaft 10, T 25 and pipe 25' and into the discharging nozzle 26. This discharging nozzle is capable of oscillation, so that when the hot water which is being employed may be discharged into the hot water tank 27 for reuse, and when cold water is being used the nozzle 26 will be swung into such a position that the water will be discharged into a cold water tank 28 for reuse.

The hot water tank is shown provided with a conduit 29 controlled by a valve 30, and the cold water tank is shown provided with a conduit 31 controlled by a valve 32 which connects by conduits 33 and 34 respectively with a conduit 35 leading through a valve 36 to a connecting conduit 37 which runs into the supply pipe 38 of the pump 20. By this means the water from the tanks 27 and 28 may be selectively drawn through the pump and passed through the agitators and discharged into either of tl tanks as desired.

Figure 4:
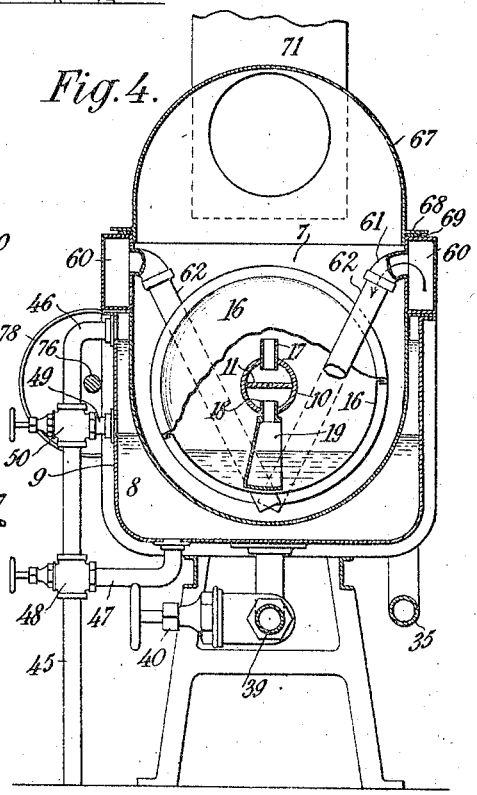
Fig. 4 is a cross-section taken on a plane at about the line 4—4 of Fig. 2 looking in the direction of the arrow.

The water for the jacket space 8 will be led from the pump 20 through the conduit 39 past the valve 40, and may also be led from the discharge chamber 24 by means of the conduit 41 past the T 42 and valve 43 to the conduit 44 and into the jacket space. A discharge for the water is provided for preventing undue pressure within the jacket. Such discharge in the present instance comprises a pipe 45, see Fig. 4, which pipe leads to some suitable waste not shown. This pipe has a connection at 46 with the upper portion of the jacket space. It also has a connection 47 with the lower portion through the valve 48, and has a connection 49 through the valve 50 at an intermediate point. This intermediate connection is for the purpose of maintaining the jacket partly filled with water as occasion may demand.

The temperature of the water in the jacket may be maintained by pumping the hot water into it, or it may be maintained by a supply of steam. An exhaust steam connection is shown at 51 entering the lower portion of the jacket past a suitable controlling device 52, also at 51' entering conduit 44. A live steam supply is also illustrated at 53 having a connection 54 into the supply 38 for the pump, and a connection 56 into the chamber 8, so that the heat of live steam may be directly applied to the milk under treatment if occasion may demand, as for example, if a coagulated or cooked product is desired.

Under some circumstances it is found desirable to connect the various portions of the apparatus directly with the city water supply, and for this purpose a connection 57 is provided which connects with the live steam connections under control of the valve 57', so that the water may be caused to pass to the jacket and to the treating vessel 7, or any of these as occasion may demand, by the proper manipulation of the valves in this system of piping.

In certain treatment of the milk it is desirable that the milk be aerated during its heating and during its cooling. Purified air is an efficient medium for the aeration, and for the present description air will be mentioned. At the top of the chamber 7 on each side there is shown an air chamber 60. These air chambers are provided with connections 61 to which downwardly directed nozzles 62 are connected. These nozzles are shown extending to a point near the bottom of the vessel 7 and substantially beneath the agitator shaft 10. In the present illustration the nozzles are disposed between adjacent agitator disks, and alternately on opposite sides, so that a considerable amount of agitation of the milk is produced by the air discharged through the nozzles. The air is shown supplied to the chambers 60 from a blower 63 which draws air by means of a conduit 64 through a filtering device 65 and discharges into the chambers 60 through its discharge conduits 66.

A cover 67 is provided for the vessel 7, which cover fits down upon the top of the vessel with a substantially air-tight joint. It is shown provided with a flange 68 resting upon a packing 69 interposed between the flange and the top wall of the chamber 60. The air is preferably exhausted from within the cover 67 by means of a fan 70 having a connection 71 with the end of the cover 67 and a discharge spout 72.

Figure 3:
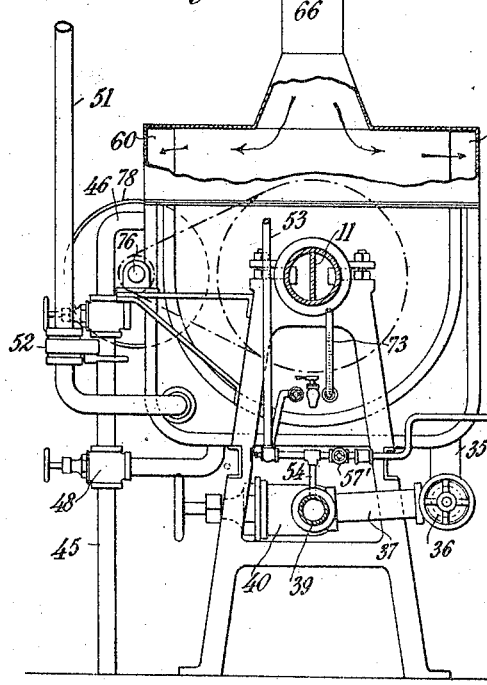
Fig. 3 is an end elevation taken on a plane at about the line 3—3 of Fig. 2 looking in the direction of the arrow.

A suitable gage for the contents of the vessel is shown at 73 (Fig. 3).

The contents of the vessel 7 will be drained off at some suitable point centrally located. A discharge is shown at 74 controlled by a suitable valve 75.

The main driving shaft of the machine is illustrated at 76 (Fig. 5), driven by means of fast and loose pulleys 77, 78 from a suitable belt not shown. The shaft 20' of the pump 20 may be driven from this shaft, as also the shaft of the agitator and the fans. These driving connections are obvious, and form no part of the present improvement and therefore are not described in detail.

In certain treatments of milk, for instance in making condensed milk, the thickened portions of the milk will at times adhere to the surfaces of the agitators, thereby acting as insulators and decreasing the efficiency thereof. A convenient form of scraper for keeping the surfaces free from this accumulation is illustrated in Fig. 2, and comprises a pair of wooden legs 79 shown pivoted together at 80. These legs conform substantially to the contour of the agitators, and are held in engagement therewith by means of a suitable extension spring 81 connected to the extending ends 82 of the legs 79. Thus the scrapers are held to their work yieldingly by the elastically yieldable connection 81. The scrapers may be readily removed for the purpose of cleansing or when they are not needed, and may be as readily placed in position. The scrapers are shown held in position by means of a pair of longitudinally disposed bars 83 and cross bars 84.

The improved method will be carried out with the present mechanism in substantially the following manner: The milk to be treated will be placed in the vessel 7. Hot water will be drawn by means of the pump 20 through the connection 39, and will be pumped past the T 21 into the chamber 23 and be caused to pass from the supply side 12 of the hollow longitudinally divided shaft 10 through the conduits 17 into the various agitators so as to charge them as required. From these agitators it will pass through the discharge conduits 18 into the discharge side of the said shaft 14, and from such shaft into the chamber 24, and from there past T 25 and through conduit 41, valve 43, conduit 44 and into the jacket space 8, and from such jacket space back to the pump by conduit 39 past valve 40 to conduit 38. If it is desired to raise the temperature beyond that produced by the circulation of the water in the jacket, exhaust steam will be admitted from the supply 51 by opening the valve 52, and if further elevation of temperature is desired, the live steam will be admitted by the connection 54. If the milk requires to be brought to a still higher temperature than that afforded by means of the jacket and the agitators, live steam may be admitted by means of the connection 56 directly to the milk in the vessel 7.

After the milk has been treated for a sufficient length of time to bring it to the desired temperature, and maintained for a suitable time at that temperature, the supply to the pump 20 will be shut off at valve 40 and the water permitted to exhaust from the agitators. The water will be drawn from the jacket and discharged through the pipe 45, and cold water will then be drawn from the tank 28 into the pump 20 by opening valves 36 and 32 and closing valve 43, whereupon the cold water is caused to circulate. At this time, however, the nozzle 26 will be preferably turned so that the cold water will be discharged into the cold water tank 28.

In practising this method, the entire mass of milk under treatment in the vessel 7 will be uniformly brought to the desired temperature rapidly, because the jacket will be of uniform temperature throughout, and the agitators of the series will be of a uniform temperature, and added to this the agitation effected by the aeration through the nozzles 62 will make for uniformity of temperature. After the milk has been held at the desired temperature for the proper length of time, the heating medium will be quickly withdrawn and almost instantly replaced by a cooling medium which will have the same temperature throughout the entire apparatus, whereby the milk will have the heat units rapidly removed and be brought down to the safe temperature. By this means injurious results which are liable to ensue if milk is permitted to remain at certain warm temperatures will be avoided, and the product will be that which is sought to be obtained.

Although but one form of apparatus has been described, yet it will be apparent that changes may be made in the method and in the apparatus within the scope of the claims, without departing from the spirit of the invention.

I am aware that prior to my invention it has been sought to satisfactorily lower, or otherwise vary the temperature of milk, in such considerable bulks as required by economical practice on industrial scales, and that to that end liquids, the temperature of which differed from that of the milk, have been circulated through a therein more or less immersed stationary, or rotating, system of containers or agitators. Also that in one such instance, such liquid was delivered to each of two such containers independently of the other; also, that, for heating milk, steam has been supplied to each independently of the others of a plurality of such rotating containers; but none of such prior devices do I regard as comprising my invention, or as covered by my herein made claims, for the reasons, among others, that in all such prior cases in which liquid has been relied upon as the tempering medium, its course, location and distribution relatively to the body of milk treated have been such as to initiate the tempering proximate to one extremity of such body, and to continue it progressively toward the meanwhile comparatively tempered opposite extremity, thus permitting undue duration, in some parts, of temperatures favorable to development of malign bacteria or germs, whereby the final product has been injured or ruined; whereas in those cases in which steam has, as aforesaid, been used as the heating medium, the height and uncontrollability of its temperatures have, notwithstanding their sterilizing effects, proved, I believe, prohibitory in industrial pasteurization, evaporation, concentration, condensation, or drying of milk, owing to resultant scalding, burning, coagulation or other injury of the product;— the fact being that milk cannot be treated at temperatures of 212° F. or higher, without, for many purposes, undesirably or prohibitively changing the character properties and behavior of more, or less, of its constituents.

By my aforesaid method, however, I not only employ, as the tempering medium, an agent, i. e. a liquid, preferably water, the stability and controllability of whose temperature is, I have found, unrivaled for the purpose, but that agent is for the first time, as I believe, applied in such a continuous, copious and uniform stream, and so subdivided, located, and directed within the body of milk treated, as to prevent, in any region of such body more than another, such duration of transition temperatures as might admit of harmful propagation of undesired germs and bacteria in the milk. By transition temperatures, I mean those through which the milk must pass while being tempered by any method, and certain of which are, as is well known, favorable to such propagations. By my method, I am enabled to raise or lower the temperature of the body of milk so rapidly and so uniformly throughout all parts of the mass at once, that the transition temperatures are left nowhere long enough to be substantially injurious, the entire body of my milk being, as it were, simultaneously "flashed" from one sanitary and unpropagative temperature to another, and so rapidly as to preclude the noxious duration proximate to any extremity, or in any region, more than another of said body, of any temperatures favorable to propagation of undesired germs or bacteria in the milk. My method is particularly important and successful in chilling heated milk down to temperatures of sterility. My simultaneous agitation of the milk, i. e. its impulsion to move constantly relatively to the stream of tempering liquid is also of great assistance in speeding and equalizing the changes of temperature. Likewise the constant immediate removal from the disks of thereto-adherent thickened portions of the milk, while in, or rising from and still closely adjacent to, the latter and their consequent liberation and return to the latter with minimum exposure to the air, are practically indispensable to the successful practice of my method.

Moreover, the effecting of such removals by means which are not only yielding, but also provided with members, the operative surfaces of which are, like those of milk-soaked wood for example, more yielding and resilient and less temperature-conductive than those of the disks, is of equal importance because I am thereby enabled to not only more thoroughly and effectively remove the adhesions from the disks, but also to diminish risk of over-heating, and particularly also mechanical injury to milk constituents, as for example, such crushing or bursting of the butter-fat globules as results in their "smearing" with consequent well known promotion of sourness or rancidity in the final product, etc.

The products of my process are not only sufficiently sterile as regards germs and bacteria, but free from their even temporarily occasioned malign effects, and when desired, as for pasteurized, evaporated, concentrated, condensed, or even finally dried, products, may, by aid of my procedure, be made to retain all of the constituents of the milk in their normal state, except as regards percentage of therewith associated water, and thus the flavor and peptogenic effects of the natural milk.

I claim as my invention:—

1. The method of treating a body of milk which comprises raising and maintaining its temperature above normal by aid of heat transferred thereto from a therewith contacting rigid surface, and simultaneously, at frequently repeated, equally-timed-apart intervals, under cover of the milk, wiping from said surface therewith contacting or adhering thickening milk.

2. The method of treating a body of milk which comprises raising and maintaining its temperature above normal by aid of heat transferred thereto from a therewith contacting surface, and simultaneously, at frequently repeated intervals under cover of the milk, yieldingly wiping from said surface therewith contacting or adhering thickening milk, whereby said surface is kept uniformly and constantly cleared, heat transference therefrom promoted, and said contacting or adhering thickening portions of the milk timely separated therefrom, and returned to the interior of said body, without being unduly exposed to atmosphere and without being coagulated, burned, or injuriously frictioned or compressed.

In witness whereof, I have hereunto signed my name in the presence of two subscribing witnesses.

CHARLES H. CAMPBELL.

Witnesses:
 CHAS. LYON RUSSELL,
 FRED WHITE.